United States Patent
Tsukihiji et al.

(10) Patent No.: US 6,273,351 B1
(45) Date of Patent: Aug. 14, 2001

(54) SPINNING REVERSAL PREVENTIVE MECHANISM FOR A REEL FOR FISHING

(75) Inventors: Muneaki Tsukihiji; Akira Kobayashi; Takashi Shibata, all of Tokyo (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 09/422,243

(22) Filed: Oct. 21, 1999

(30) Foreign Application Priority Data

Oct. 21, 1998 (JP) .................................................. 10-299305

(51) Int. Cl.[7] .................................................. A01K 89/02
(52) U.S. Cl. .......................................... 242/247; 242/299
(58) Field of Search .................................. 242/247, 248, 242/257, 298, 299, 301

(56) References Cited

U.S. PATENT DOCUMENTS

| | | | |
|---|---|---|---|
| 4,373,683 | * 2/1983 | Kyker ..................................... | 242/248 |
| 4,919,361 | * 4/1990 | Kobayashi ............................. | 242/247 |
| 5,370,330 | * 12/1994 | Uehara et al. ......................... | 242/247 |
| 5,374,001 | * 12/1994 | Yamaguchi et al. .................. | 242/299 |
| 5,570,851 | * 11/1996 | Yamaguchi et al. .................. | 242/247 |
| 5,586,734 | * 12/1996 | Kawabe et al. ....................... | 242/247 |
| 5,738,292 | * 4/1998 | Kang et al. ........................... | 242/247 |

FOREIGN PATENT DOCUMENTS

| | | |
|---|---|---|
| 25734 | 2/1990 | (JP) . |
| 8112049 | 5/1996 | (JP) . |

* cited by examiner

*Primary Examiner*—Emmanuel M. Marcelo
(74) *Attorney, Agent, or Firm*—Liniak, Berenato, Longacre & White, LLC (57) ABSTRACT

A spinning reel for fishing includes a rotor rotatably supported in a reel body, a drive mechanism for driving the rotor by operating a handle mounted on the reel body, a first reversal preventive mechanism for preventing the rotor from rotating in the direction of playing out a fishline by stopping the drive mechanism from rotating in the reverse direction at the time of casting the fishline, and a second reversal preventive mechanism for holding the rotor in a predetermined position by stopping the drive mechanism from rotating in the reverse direction. The first reversal preventive mechanism is formed of a rolling one-way clutch, and the second reversal preventive mechanism is caused to hold the rotor in the predetermined position by switching the first reversal preventive mechanism to non-working condition.

5 Claims, 7 Drawing Sheets

SPINNING REVERSAL PREVENTIVE MECHANISM FOR A REEL FOR FISHING

BACKGROUND OF THE INVENTION

This invention relates to a spinning reel for fishing with a mechanism for preventing a reverse rotation of a rotor.

As disclosed in Japanese Laid-Open Publication No. 8-112049 and Japanese Utility Model Publication No. 2-5734, conventional spinning reels for fishing are provided with a reversal preventive mechanism for preventing a rotor from rotating in the direction of playing out a fishline during the operation of casting and taking up the fishline. The reversal preventive mechanism prevents the reverse rotation of a drive mechanism for rotatively driving the rotor.

The reversal preventive mechanism disclosed in Japanese Laid-Open Publication No. 8-112049 employs a rolling one-way clutch (a roller type one-way bearing), and functions to switch ON/Off the rotor (i.e., to make the rotor rotatable forwardly and reversely/to prevent the rotor from reversing) by utilizing the wedge action of the roller incorporated in the one-way clutch.

It is thus possible in view of the structure of the reversal preventive mechanism utilizing the wedge action of the roller to prevent the drive mechanism from reversing instantly when the rotor is reversed with a small degree of play in the reverse direction. On the other hand, this reversal preventive mechanism is often employed in mainly small-sized spinning reels because the reversal preventive force is insufficient.

The reversal preventive mechanism disclosed in Japanese Utility Model Publication No. 2-5734 employs a reversal preventive ratchet wheel and a reversal preventive pawl. An operating member is used to bring the reversal preventive pawl into engagement with and disengagement from the reversal preventive ratchet wheel so as to switch ON/OFF the rotor.

As the latter reversal preventive mechanism has strength greater than that of the rolling one-way clutch and is simple in structure, it is often employed in combination with a self-centering mechanism.

Such a conventionally known self-centering mechanism is used to hold the rotor in such a position that the fishline wound on a line roller may be picked up by the index finger of the hand gripping a fishing rod (hereinafter called the 'centering position') when terminal tackles are cast. As the spinning reel for fishing disclosed in Japanese Utility Model Publication No. 2-5734 is formed with the self-centering mechanism including a ratchet wheel having a single tooth and a retaining pawl engageable therewith, in addition to the reversal preventive ratchet wheel having a plurality of teeth and the reversal preventive pawl, the rotor may be held in the centering position by the self-centering mechanism when the reversal preventive mechanism is released.

Notwithstanding, the pointed-out drawback of the spinning reel for fishing disclosed in Japanese utility Model Publication No. 2-5734 is that a hooking miss tends to occur when matching a bite delays because a degree of play is great when the reversion is stopped as the reversal preventive mechanism essentially comprised of the reversal preventive ratchet wheel and the reversal preventive pawl.

SUMMARY OF THE INVENTION

An object of the present invention made in view of the aforementioned situation is to provide an improved arrangement for a spinning reel for fishing which is equipped with both a reversal preventive mechanism for preventing a rotor from rotating in the direction of playing out a fishline and a second reversal preventive mechanism such as a self-centering mechanism. The improved arrangement can make smaller a degree of play of the reversal preventive mechanism in the direction of reversing the rotor during the operation of taking up the fishline, and can surely prevent the rotor from rotating in the reverse direction.

In order to accomplish the object above, a spinning reel for fishing according to a preferable embodiment of the present invention comprises: a rotor rotatably supported in a reel body, a drive mechanism for driving the rotor by operating a handle mounted on the reel body, a first reversal preventive mechanism for preventing the rotor from rotating in the direction of playing out a fishline by preventing the drive mechanism from rotating in the reverse direction when the operation of casting and taking up a fishline is performed, and a second reversal preventive mechanism for holding the rotor in a predetermined position by preventing the drive mechanism from rotating in the reverse direction. The spinning reel is characterized in that the first reversal preventive mechanism is formed of a rolling one-way clutch and that switching the first reversal preventive mechanism to non-working condition causes the second reversal preventive mechanism to hold the rotor in the predetermined position.

If the first and second reversal preventive mechanisms are set in the working condition when the operation of casting and taking up the fishline is performed, the wedge action of the roller of the rolling one-way clutch in the first reversal preventive mechanism instantly stops the rotor from rotating in the direction of playing out the fishline.

Even though the rotor slips in the direction of playing out the fishline because of a strong tug of fish exceeding the capacity of the rolling one-way clutch, it is ensured that the rotor is prevented by the second reversal preventive mechanism from rotating in the reverse direction.

Further, switching the first reversal preventive mechanism to the non-working condition causes the second reversal preventive mechanism to hold the rotor in the predetermined position.

It is preferable that the spinning reel for fishing in further comprises a first operating portion for switching the working and non-working conditions of the first reversal preventive mechanism, and a second operating portion for simultaneously switching the working and non-working conditions of both the first and second reversal preventive mechanisms. The first operating portion is used for switching the working and non-working conditions of the first reversal preventive mechanism, and the second operating portion is used for simultaneously switching the working and non-working conditions of both the first and second reversal preventive mechanisms.

It is preferable that the first operating portion is urged in one direction so that the working condition of the first reversal preventive mechanism may be released only through the operation of an angler. The working condition of the first reversal preventive mechanism is released only when an angler operates the first operating portion, and the first reversal preventive mechanism returns to the working condition when the angler takes his hand off the first operating portion.

The present disclosure relates to the subject matter contained in Japanese patent application No. Hei. 10-299305 (filed on Oct. 21, 1998).

DESCRIPTION OF THE PREFERRED EMBODIMENT

A detailed description of an embodiment of the present invention will be given with reference to the drawings.

Figure 1:
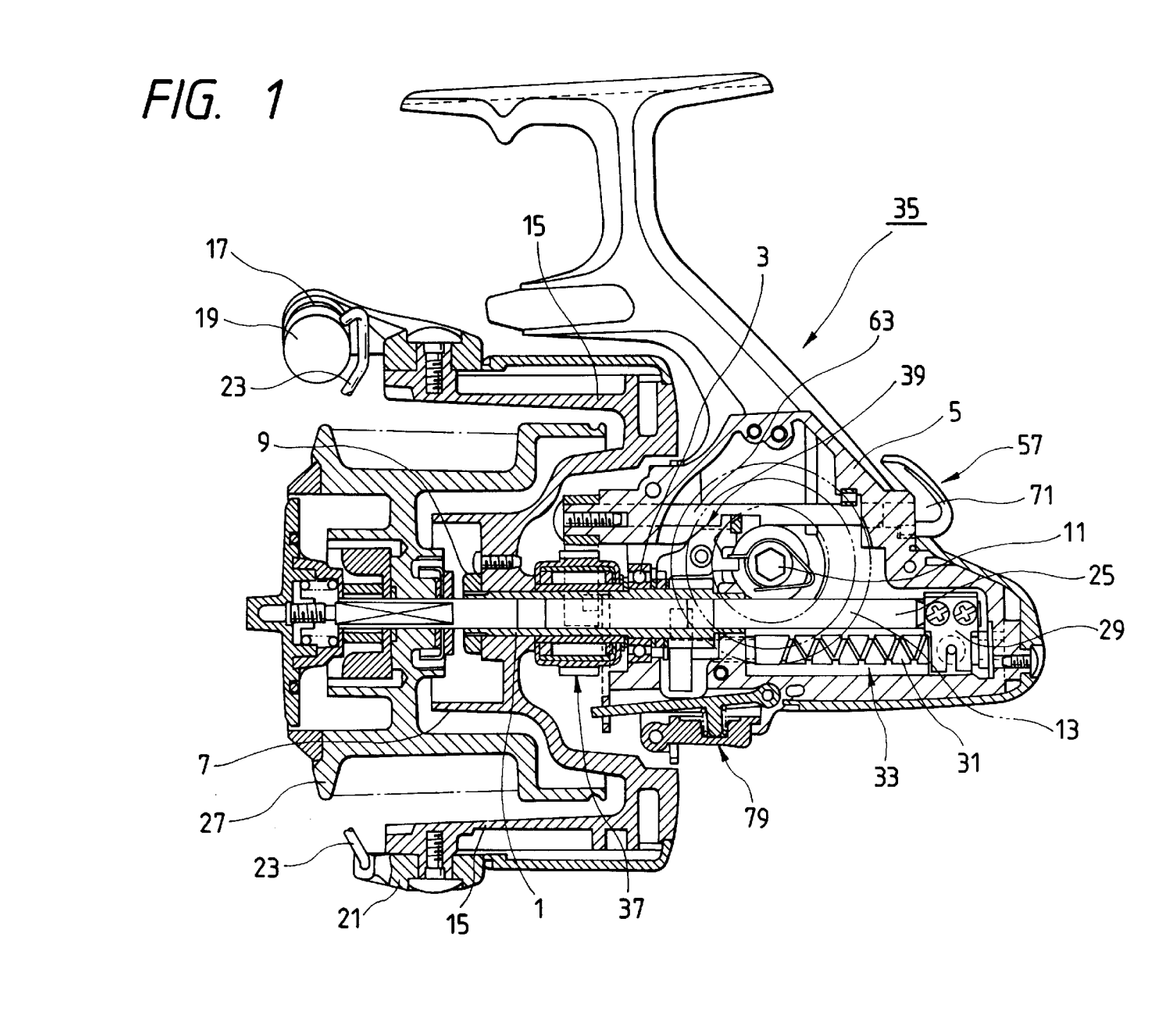
FIG. 1 is a sectional view of a spinning reel for fishing embodying the present invention.
Figure 2:
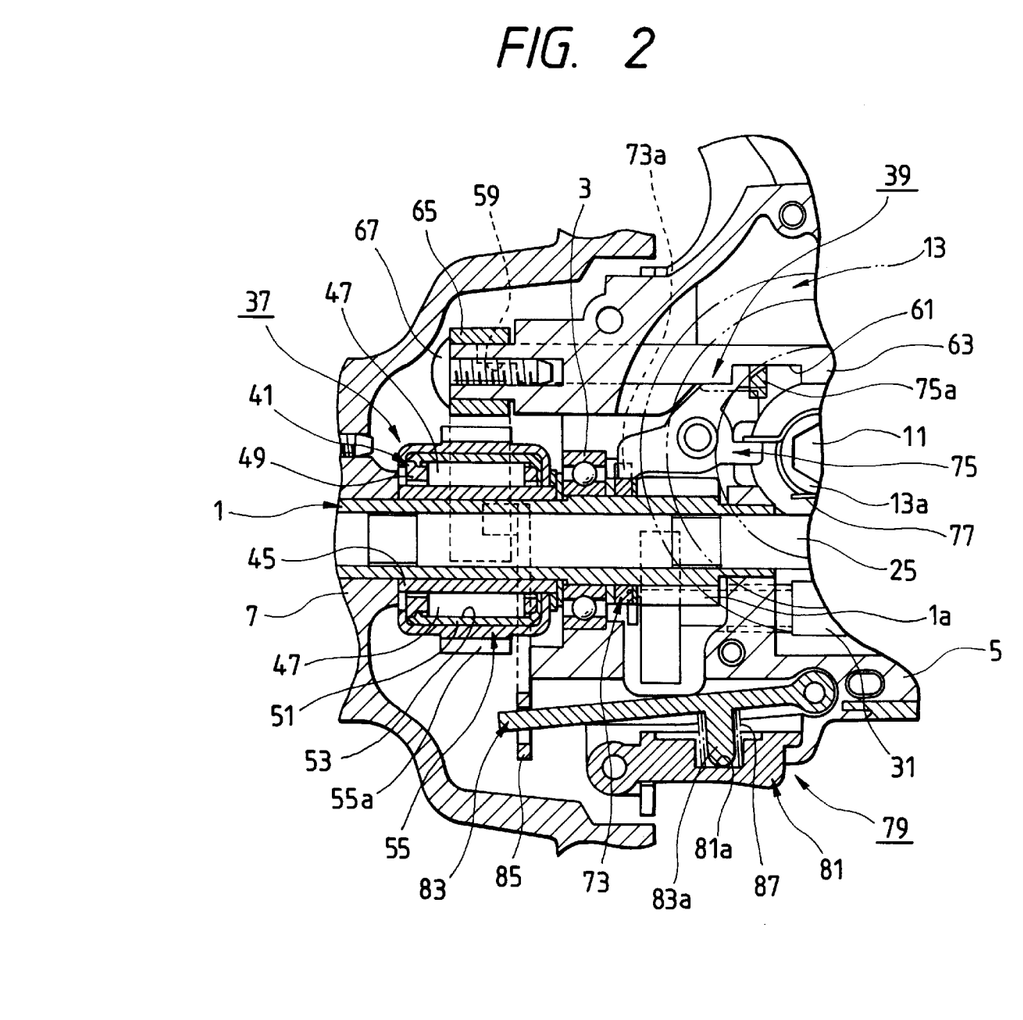
FIG. 2 is an enlarged sectional view of the principal part of a reversal preventive mechanism and a self-centering mechanism mounted in the spinning reel for fishing in FIG. 1.

FIG. 1 shows a spinning reel for fishing according to the present invention, wherein reference numeral 1 denotes a hollow pinion 1 rotatably supported in the forepart of a reel body 5 via a bearing 3, and a rotor 7 is fixed to the leading end of the pinion 1 by means of a nut 9. As shown in FIG. 2, further, a drive gear 13 secured to a handle shaft 11 is engaging with a tooth 1a provided on the outer periphery on the rear end side of the pinion 1. In this case, the rotor 7 is arranged so that it may be rotated in the direction of taking up a fishline via the drive gear 13 and the pinion 1 through the take-up operation of a handle (not shown).

A pair of support arms 15 are formed for the rotor 7, and a semi-annular bail 23 is fitted to the leading ends of the support arms 15 via a bail arm 19 and a bail holder 21 that mount the line roller 17, the bail 23 being reversible between fishline taking-up and casting positions.

Further, reference numeral 25 in FIG. 1 denotes a spool shaft 25 passing through the pinion 1, a spool 27 being fitted to the rotor-side projected end of the spool shaft 25. A conventionally known traverse mechanism 33 including a slider 29 and a traverse cam shaft 31 is mounted on the rear end side of the spool shaft 25. When the rotor 7 is rotated in the direction of taking up the fishline by operating the handle after bringing down the bail 23 to the fishline taking-up position, the fishline (not shown) is wound on the spool 27 that is caused by the traverse mechanism 33 to make a longitudinal traverse movement. When the terminal tackles are cast after reversing the bail 23 to the fishline casting position, the fishline wound on the spool 27 is played out spirally.

Although the spinning reel 35 according to this embodiment of the invention is fitted with a reversal preventive mechanism for preventing the rotor 7 from rotating in the direction of playing out the fishline during the casting operation and a self-centering mechanism 39 (a second reversal preventive mechanism) for holding the rotor 7 in the centering position, in addition to an arrangement similar to the aforementioned conventional one, the embodiment thereof is characterized by the use of a rolling one-way clutch (hereinafter called the 'one-way clutch') in the reversal preventive mechanism 37.

Figure 3:
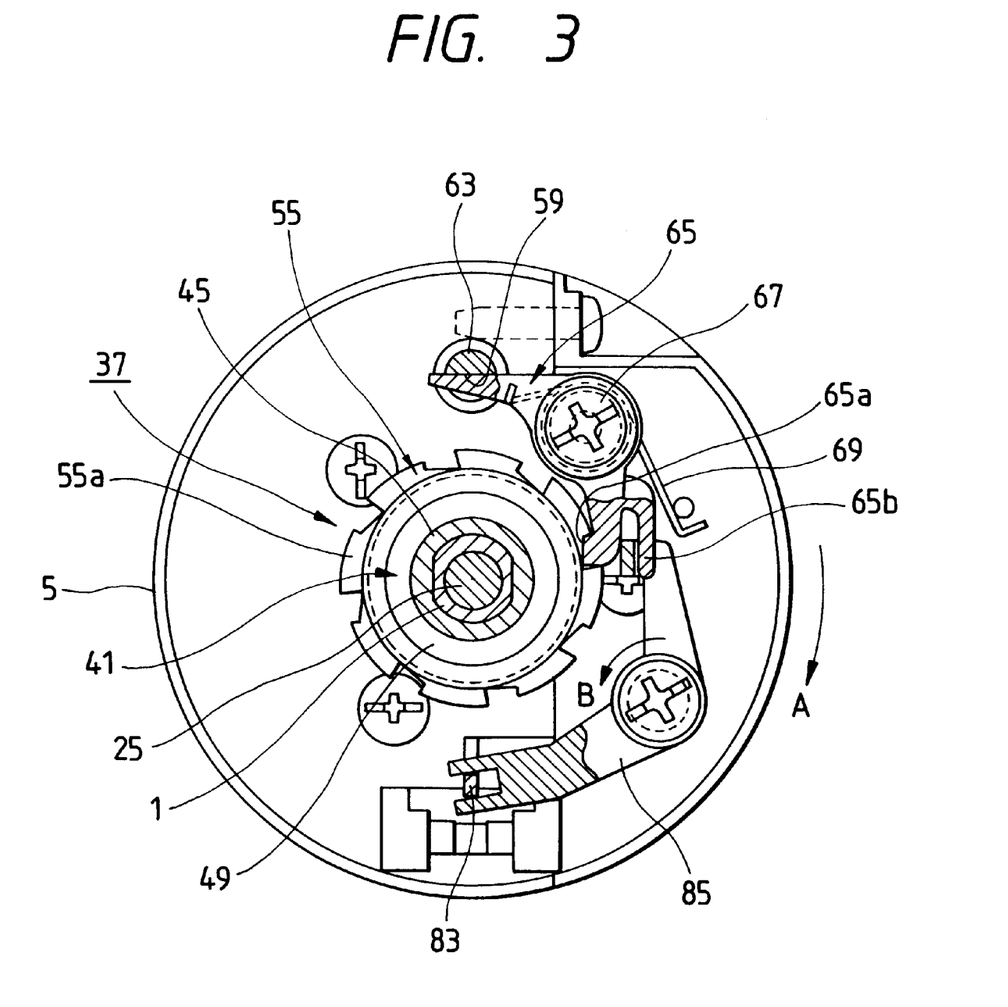
FIG. 3 is a sectional view of the spinning reel for fishing with the reversal preventive mechanism and the self-centering mechanism in working condition.

FIGS. 2 and 3 show the reversal preventive mechanism 37 in detail, wherein reference numeral 41 denotes the one-way clutch including a cylindrical inner ring 45 immovably mating with the outer periphery of the pinion 1, a cylindrical roller holding body 49 for pivotally supporting, from before and behind, six rollers 47 disposed at equal intervals and a cylindrical outer ring 51 into which the roller holding body 49 is fitted, the roller holding body 49 being securely fitted in between the inner and outer rings 45 and 51.

On the peripheral face of the outer ring 51 is a guide slot 53 substantially triangular in cross section and corresponding to each roller 47. The roller holding body 49 is also provided with a spring (not shown) for urging each roller 47 in the direction of wedging the roller 47 between the inner and outer rings 45 and 51 (in the direction of playing out the fishline on the rotor 7 as indicated by an arrow A in FIG. 3). Moreover, a ratchet gear 55 having a plurality of ratchet pawls 55a is immovably mated with the outer periphery of the outer ring 51.

In the upper rear portion of the reel body 5, as shown in FIGS. 1 and 2, a stay-like operating member 63 whose cam-like working portions 59 and 61 are respectively formed in the leading end and substantially intermediate portions in the same direction of the peripheral face of the operating member 63 is pivotably and securely mounted along the spool shaft 25. The operating member 63 is used as a second operating portion 57 for switching the working and non-working conditions of the reversal preventive mechanism 37 together with the self-centering mechanism 39.

As shown in FIG. 3, further, a substantially L-shaped retaining piece 65 is pivotably secured to the reel body 5 with a machine screw, one end side of the retaining piece 65 being brought into contact with the working portion 59, a retaining pawl 65a that can retain the ratchet pawl 55a being formed on the other end side thereof. The retaining piece 65 is urged in one direction by a torsion coil spring 69 fitted to the machine screw 67 so that the ratchet pawl 55a may be retained by the retaining pawl 65a at all times.

Although the retaining pawl 65a of the retaining piece 65 is so arranged as to retain the ratchet pawl 55a when the one end side of the retaining piece 65 is brought into contact with the working portion 59, as the rotation of the outer ring 51 of the one-way clutch 41 in the direction of the arrow A is regulated when the ratchet pawl 55a is thus retained by the retaining pawl 65a, the rotation of the inner ring 45 in that direction is regulated because of the wedge function of the roller 47, which results in stopping the rotor 7 from rotating in the direction of playing out the fishline.

Figure 4:
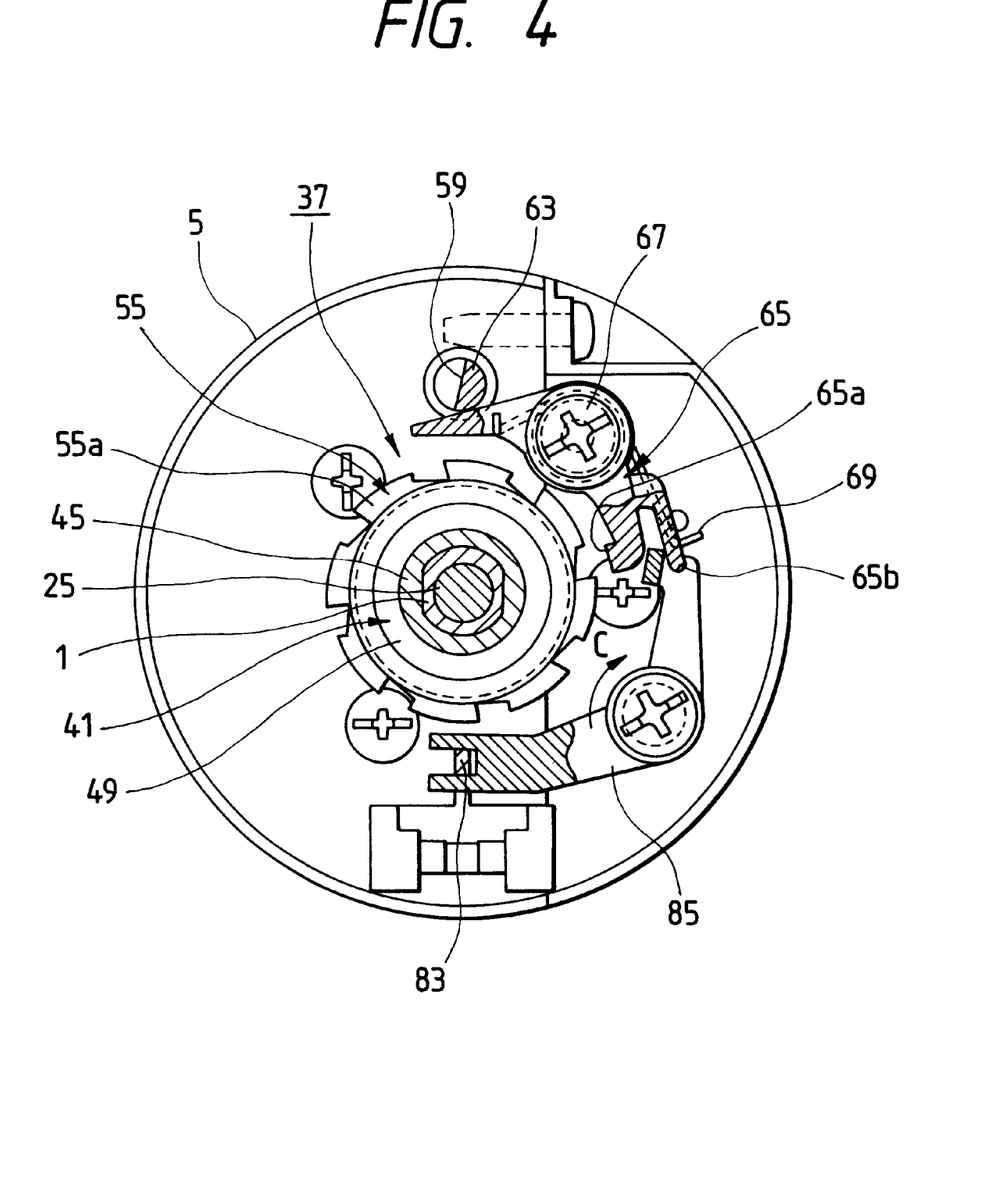
FIG. 4 is a sectional view of the spinning reel for fishing with the reversal preventive mechanism and the self-centering mechanism in non-working condition.

Meanwhile, the operating member 63 is rotated by 90° or greater by operating a switch lever 71 secured to the rear end of the operating member 63 as shown in FIG. 4. Then the retaining piece 65 is rotated by the operating member 63 against the spring force of the torsion coil spring 69 with the machine screw 67 as the center of rotation. Thus, the ratchet pawl 55a and the retaining pawl 65a are released from the retained condition.

When the ratchet pawl 55a and the retaining pawl 65a are thus released from being retained, the outer ring 51 of the one-way clutch 41 are made rotatable forwardly and reversely. Then the wedge function of the roller 47 is released and the inner ring 45 and the pinion 1 also become rotatable in both directions of playing out and taking up the fishline, whereby the reversal preventive mechanism 37 is switched to the non-working condition.

Figure 5:
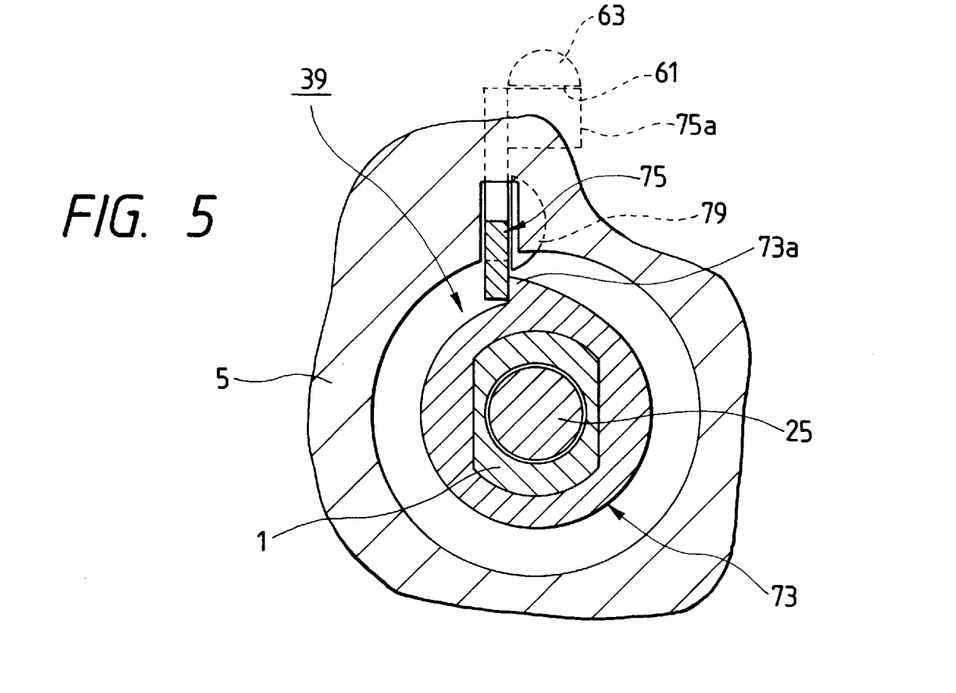
FIG. 5 is a sectional view of the self-centering mechanism in the working condition.

As shown in FIGS. 2 and 5, further, a retaining gear 73 having one tooth 73a is immovably mated with the outer periphery of the pinion 1 neighboring the bearing 3. As a retaining piece 75 that is engageable with the tooth 73a is pivotably secured to the reel body 5 with the machine screw, the retaining gear 73 and the retaining piece 75 constitute the self-centering mechanism 39.

As described above, the second operating portion 57 performs the operation of switching the working and non-working conditions of the self-centering mechanism 39. While an engaging portion 75a provided on the rear end side of the retaining piece 75 is kept contacting the working portion 61, the retaining piece 75 is urged by a torsion coil spring 77 fitted to the boss 13a of the drive gear 13 in the one direction in which the tooth 73a is released from being retained as shown in FIG. 2, though the retaining piece is retaining the tooth 73a as shown in FIG. 5.

Figure 6:
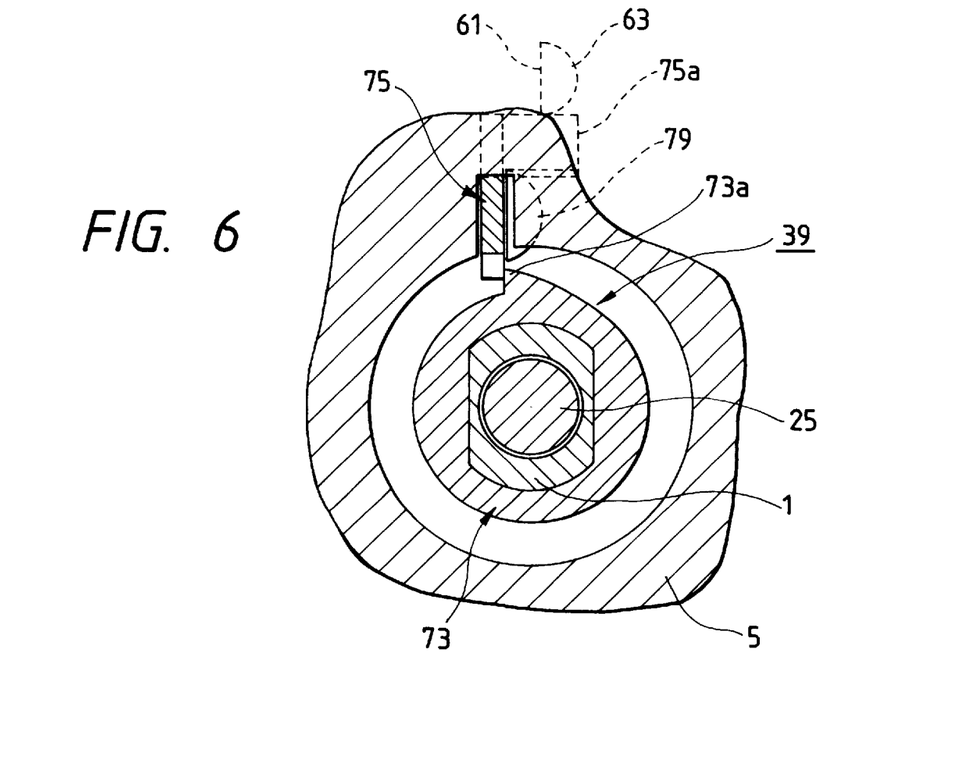
FIG. 6 is a sectional view of the self-centering mechanism in the non-working condition.

When the switch lever 71 is rotated by 90° or greater as shown in FIG. 6, the retaining piece 75 is rotated by the operating member 63 around the machine screw 67 and released from retaining the tooth 75a. Simultaneously, the ratchet pawl 55a and the retaining pawl 65a are also released from the retained condition as stated above. Further, the ratchet pawl 55a is retained by the retaining pawl 65a when the tooth 73a is retained by the retaining piece 75 as shown in FIG. 5 and the reversal preventive mechanism 37 is returned to the working condition. When the tooth 73a is thus retained by the retaining piece 75, further, the rotor 7 is held in the centering position.

Thus, according to this embodiment of the invention, the second operating portion 57 is used for switching the working and non-working conditions of the reversal preventive mechanism 37 together with the self-centering mechanism 39.

In FIG. 1, reference numeral 79 denotes a first operating portion mounted on the base of the reel body 5 and as will be described below, the first operating portion 79 is used for switching the working and non-working conditions of the reversal preventive mechanism 37 and by switching the working condition of the reversal preventive mechanism 37 to the non-working condition, makes only the self-centering mechanism 39 workable.

More specifically, as shown in FIG. 2, reference numeral 81 denotes a switch button supported in the reel body 5 so that it can be operated by pressing; and 83, a link member with a projected piece 83a to be inserted into a recessed portion 81a in the back of the switch button 81, the one end side of the link member 83 being pivotably supported by the reel body 5. As shown in FIGS. 2 and 3, further, the one end side of a substantially L-shaped retaining piece 85 pivotably secured to the reel body 5 with a machine screw is mated with the leading end of the link member 83 so that the one end side thereof is capable of free play.

On the side of the retaining pawl 65a of the aforementioned retaining piece 65 lies a sectionally L-shaped projected piece 65b, and the other end side of the retaining piece 85 is fitted in between the projected piece 65b and the retaining piece 65 in a manner capable of free play.

Since the retaining piece 65 is kept urged by the torsion coil spring 65 to retain the ratchet pawl 55a as described previously, the retaining piece 85 mating with the retaining piece involved 65 is also urged by the spring force of the torsion coil spring 69 in the direction of an arrow B at all times as shown in FIG. 3. Moreover, as one coil spring 87 is installed between the link member 83 and the switch button 81 along the aforementioned projected piece 83a, the switch button 81 is kept urged toward the outside of the reel body 5 by the spring force of the coil spring 87 and the torsion coil spring 69.

While the retaining piece 85 of the first operating portion 79 is thus engaging with the retaining piece 65 of the reversal preventive mechanism 37, the retaining piece 85 rotates in the direction of an arrow C as shown in FIG. 4 when the second operating portion 57 operates to switch the reversal preventive mechanism 37 and the self-centering mechanism 39 to the non-working condition. With this operation, the switch button 81 is moved into the reel body 5 against the spring force of the coil spring 87 via the link member 83.

Figure 7:
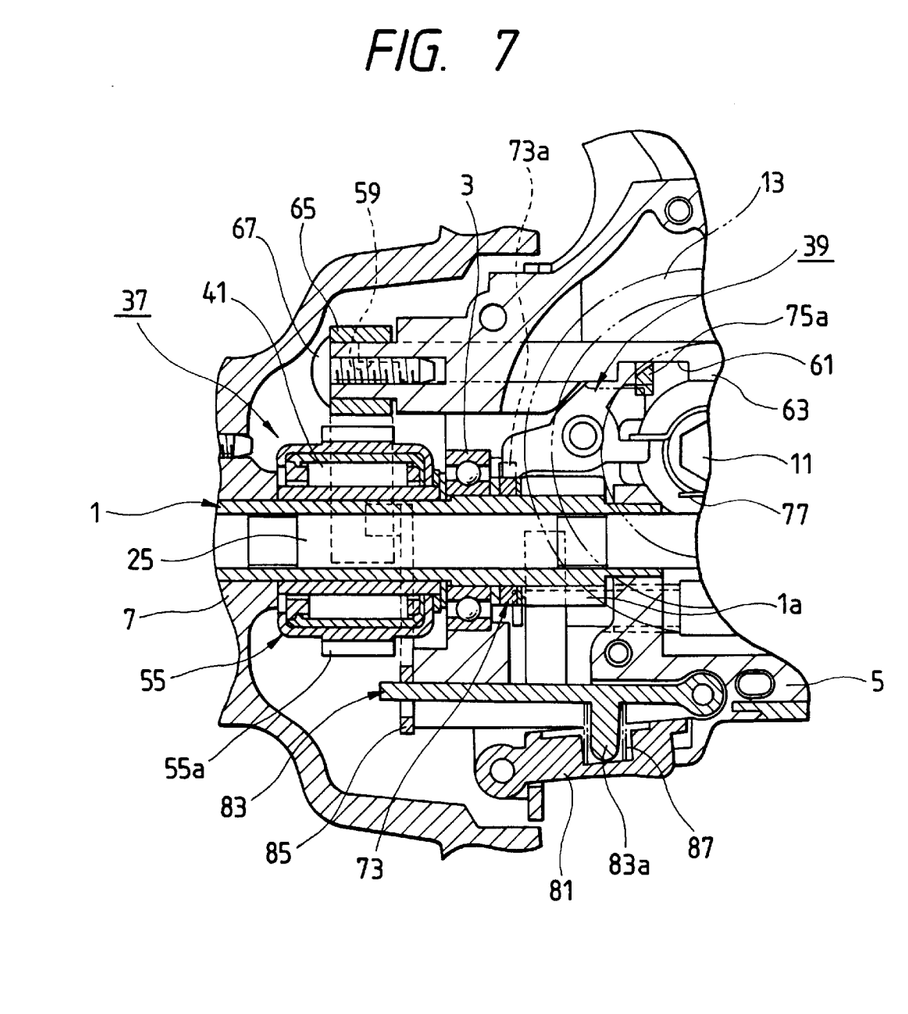
FIG. 7 is an enlarged sectional view of the principal part of the reversal preventive mechanism in the non-working condition and the self-centering mechanism.
Figure 8:
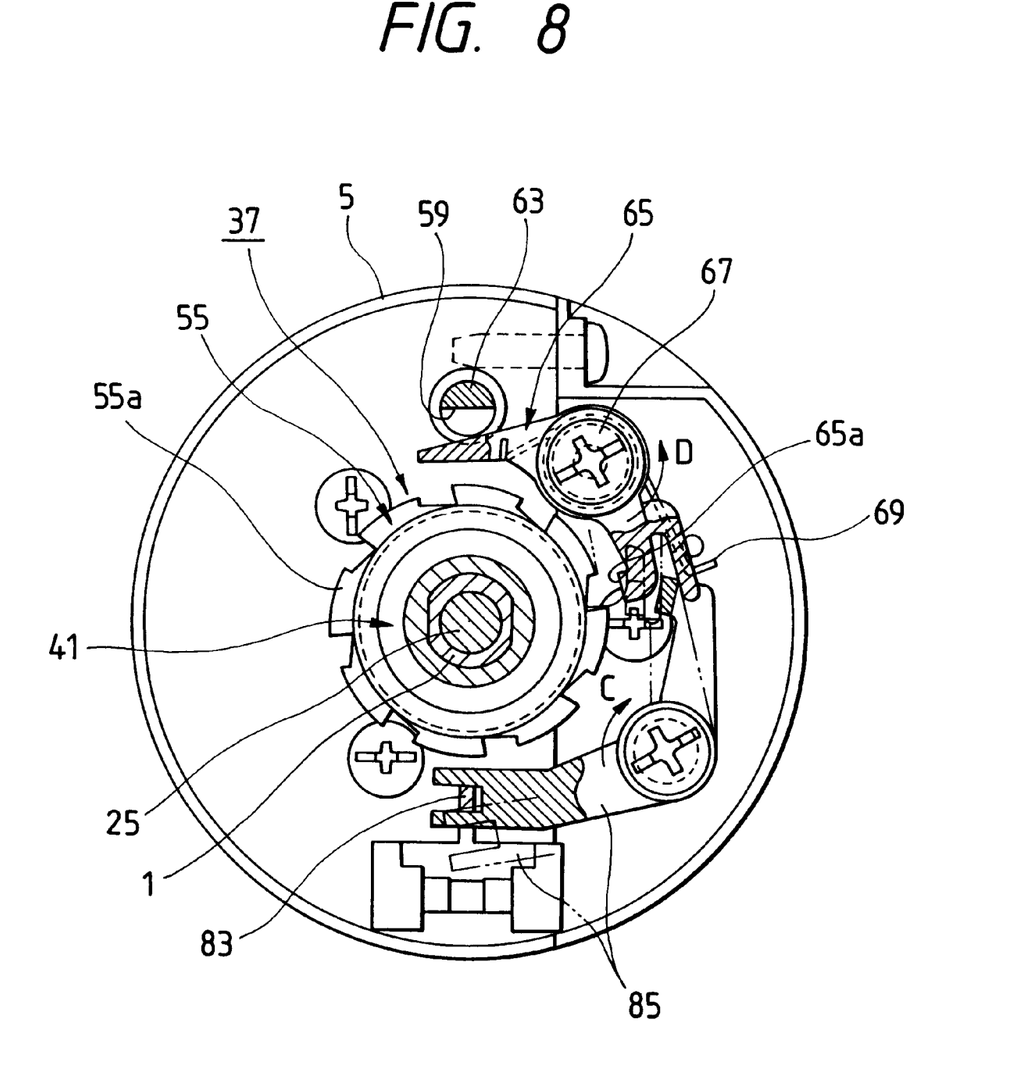
FIG. 8 is a sectional view of the reversal preventive mechanism in the non-working condition and the self-centering mechanism.

When an angler presses the switch button 81 while the reversal preventive mechanism 37 and the self-centering mechanism 39 are in the working condition as shown in FIGS. 2 and 3, the retaining piece 85 rotates in the direction of the arrow C via the link member 83 as shown in FIGS. 7 and 8. Then the retaining piece 65 retaining the ratchet pawl 55a is rotated in the direction of an arrow D so as to switch only the reversal preventive mechanism 37 to the non-working condition. When the angler takes his hand off the switch button 81, the retaining piece 65 retains the ratchet pawl 55a because of the restoring force of the torsion coil spring 69 and makes the reversal preventive mechanism 37 return to the working condition, whereas the switch button 81 is moved toward the outside of the reel body 5 again because of the restoring force of the torsion coil spring 69 and the coil spring 87 as shown in FIG. 2.

As this embodiment of the invention is thus arranged, the fishline is wound on the spool 27 making the traverse movement in the longitudinal direction of the reel body 5 when the rotor 7 is rotated in the direction of taking up the fishline by operating the handle after bringing down the bail 23 to the fishline taking-up position as in the conventional fishing reel. When the terminal tackles are cast by reversing the bail 23 to the fishline casting position, further, the fishline wound on the spool 27 is played out spirally. However, when the reversal preventive mechanism 37 is kept in the working condition as shown in FIGS. 2 and 3 by operating the switch lever 71 of the second operating portion 57 as mentioned previously, the wedge function of the roller 47 of the one-way clutch 41 in the reversal preventive mechanism 37 stops the rotor 7 from rotating in the direction of playing out the fishline.

Since the self-centering mechanism 39 is also in the working condition while the reversal preventive mechanism 37 is in the working condition, the retaining gear 73 in the self-centering mechanism 39 is retained by the retaining piece 75 as shown in FIGS. 2 and 5 even though the rotor 7 slips in the direction of playing out the fishline because of a strong tug of fish exceeding the capacity of the one-way clutch 41 during the time the fishline taking-up operation is performed to ensure that the rotor 7 is prevented from rotating in the reverse direction.

While the reversal preventive mechanism 37 and the self-centering mechanism 39 are in the working condition, moreover, the retaining piece 85 rotates in the direction of the arrow C via the link member 83 as shown in FIGS. 7 and 8 when the angler operates to press the switch button 81 of the first operating portion 79. With this operation, the retaining piece 65 retaining the ratchet pawl 55a is rotated in the direction of the arrow D and this switches only the reversal preventive mechanism 37 to the non-working condition, whereby the rotor 7 is held in the centering position by the self-centering mechanism 39 as in the conventional fishing reel.

When the angler takes his hand off the switch button 81, the retaining piece 65 retains the ratchet pawl 55a because of the restoring force of the torsion coil spring 69 and makes the reversal preventive mechanism 37 return to the working condition, whereas the switch button 81 is moved toward the outside of the reel body 5 again because of the restoring force of the torsion coil spring 69 and the coil spring 87 as shown in FIG. 2.

In order to switch the working condition of the reversal preventive mechanism 37 and the self-centering mechanism 39 to the non-working condition, the operation of rotating the switch lever 71 by 90° or greater is, as mentioned previously, performed to release the ratchet pawl 55a of the reversal preventive mechanism 37 from being retained by the retaining pawl 65a as shown in FIG. 4 and to release the retaining piece 75 of the self-centering mechanism 39 from being retained by the tooth 73a as shown in FIG. 6.

Thus, according to this embodiment of the invention, mis-hooking is reduced at the time of striking a fish because the reversal preventive mechanism 37 constituted of the one-way clutch 41 makes it possible to stop the roller 7 from rotating in the reverse direction instantly. Even though the rotor 7 slips in the direction of playing out the fishline because of a strong tug of fish exceeding the capacity of the one-way clutch 41, the angler is allowed to concentrate his attention on practical fishing because it is ensured that the rotor 7 is prevented by the self-centering mechanism 39 from rotating in the reverse direction.

According to this embodiment of the invention, it is also possible to make only the self-centering mechanism 39 fulfill its function by switching the working condition of the reversal preventive mechanism 37 to the non-working condition instantly. Therefore, the practical use of the spinning reel becomes considerably improved.

Although the reversal preventive mechanism 37 and the self-centering mechanism 39 have been used as the respective first and second reversal preventive mechanisms according to the above-described embodiment of the invention, a mechanism capable of adjusting the amount of a fishline to be played out while the rotor 7 is 180° rotated may be made a second reversal preventive mechanism by mounting a retaining gear having two 180°-spaced teeth on the pinion 1 in place of the retaining gear 73 of the self-centering mechanism 39, for example.

Further, the one-way clutch is not limited in structure to what has been defined in the above-described embodiment of the invention but may be any conventionally known one-way clutch for switching ON/OFF a roller through the switching operation of the switching portion provided for the aforementioned roller holding body.

In this case, the wedge function of the roller may be made releasable using a certain means for operating the outer ring of such a one-way clutch, for example, by setting only the first reversal preventive mechanism in the non-working condition so as to maintain the self-centering mechanism in the working condition.

In the spinning reel for fishing in each claim, mis-hooking is reduced at the time of striking a fish because the first reversal preventive mechanism constituted of the one-way clutch makes it possible to stop the roller from rotating in the reverse direction instantly. Even though the rotor slips in the direction of playing out the fishline because of a strong tug of fish exceeding the capacity of the one-way clutch, the angler is allowed to concentrate his attention on practical fishing because it is ensured that the rotor is prevented by the second reversal preventive mechanism such as the self-centering mechanism from rotating in the reverse direction.

According to the invention, it is possible for only the second reversal preventive mechanism to fulfill its function by instantly switching the working condition of the first reversal preventive mechanism to the non-working condition through the operation of the first operating portion, whereby the practical use of the spinning reel becomes considerably improvable.

What is claimed is:

1. A spinning reel for fishing comprising:

a rotor rotatably supported in a reel body;

a drive mechanism for driving said rotor by operating a handle mounted on said reel body;

a first reversal preventive mechanism for preventing said rotor from rotating in the direction of playing out a fishline by stopping said drive mechanism from rotating in the reverse direction when the operation of casting and taking up a fishline is performed; and a second reversal preventive mechanism for holding said rotor in a predetermined position by stopping said drive mechanism from rotating in the reverse direction, wherein said first reversal preventive mechanism is formed of a rolling one-way clutch, and switching said first reversal preventive mechanism to non-working condition causes said second reversal preventive mechanism to hold said rotor in the predetermined position.

2. The spinning reel for fishing according to claim 1, wherein said predetermined position of said rotor is a position that facilitates engaging said fishline by a finger of a hand holding a fishing rod.

3. A spinning reel for fishing comprising:

rotor rotatably supported in a reel body; drive mechanism for driving said rotor by operating a handle mounted on said reel body;

a first reversal preventive mechanism for preventing said rotor from rotating in the direction of playing out a fishline by stopping said drive mechanism from rotating in the reverse direction when the operation of casting and taking up a fishline is performed; and a second reversal preventive mechanism for holding said rotor in a predetermined position by stopping said drive mechanism from rotating in the reverse direction, wherein said first reversal preventive mechanism is formed of a rolling one-way clutch, and switching said first reversal preventive mechanism to non-working condition causes said second reversal preventive mechanism to hold said rotor in the predetermined position and further comprising a first operating portion for switching the working and non-working conditions of said first reversal preventive mechanism, and a second operating portion for simultaneously switching the working and non-working conditions of both said first and second reversal preventive mechanisms.

4. A spinning reel for fishing as claimed in claim 3, wherein said first operating portion is urged in one direction so that the working condition of said first reversal preventive mechanism may be released only through the operation of an angler.

5. The spinning reel for fishing according to claim 3, wherein said predetermined position of said rotor is a position that facilitates engaging said fishline by a finger of a hand holding a fishing rod.

* * * * *